(12) United States Patent
Wilson et al.

(10) Patent No.: US 11,619,400 B2
(45) Date of Patent: Apr. 4, 2023

(54) NETWORKED BOILER SYSTEM AND METHOD

(71) Applicants: John Wilson, Westfield, MA (US); Richard Osienski, Worthington, MA (US); Mark Rawson, Westfield, MA (US); Brian Hannigan, Chester, MA (US); David Abad, East Longmeadow, MA (US); Omar Fiallos, Lenoxdale, MA (US)

(72) Inventors: John Wilson, Westfield, MA (US); Richard Osienski, Worthington, MA (US); Mark Rawson, Westfield, MA (US); Brian Hannigan, Chester, MA (US); David Abad, East Longmeadow, MA (US); Omar Fiallos, Lenoxdale, MA (US)

(73) Assignee: Mestek, Inc., Westfield, MA (US)

( * ) Notice: Subject to any disclaimer, the term of this patent is extended or adjusted under 35 U.S.C. 154(b) by 486 days.

(21) Appl. No.: 15/340,468

(22) Filed: Nov. 1, 2016

(65) Prior Publication Data
US 2017/0130971 A1    May 11, 2017

Related U.S. Application Data

(60) Provisional application No. 62/251,815, filed on Nov. 6, 2015.

(51) Int. Cl.
*F24D 19/10* (2006.01)
*F22B 35/00* (2006.01)
*F24D 12/02* (2006.01)

(52) U.S. Cl.
CPC ........ *F24D 19/1009* (2013.01); *F22B 35/008* (2013.01); *F24D 12/02* (2013.01)

(58) Field of Classification Search
CPC .... F24D 12/02; F24D 19/1009; F22B 35/008; Y02B 30/14

(Continued)

(56) References Cited

U.S. PATENT DOCUMENTS 3,329,343 A * 7/1967 Geaslen ............. G05D 23/1912
                                                           237/8 R
3,576,177 A * 4/1971 Block ...................... F24D 12/02
                                                           122/1 R (Continued)

FOREIGN PATENT DOCUMENTS

| CA | 2921207 A1 * | 2/2015 |
| JP | 2000205502 A * | 7/2000 |
| KR | 101403983 B1 * | 6/2014 |

OTHER PUBLICATIONS

McCarthy et al., "Breakthrough in Boiler System Efficiencies Through New Integrated Control Technology", Industrial Heating, Jan. 1997 (1997).

(Continued)

*Primary Examiner* — Avinash A Savani
*Assistant Examiner* — Deepak A Deean
(74) *Attorney, Agent, or Firm* — Grogan, Tuccillo & Vanderleeden, LLP

(57) ABSTRACT

A networked boiler system includes a first boiler, at least one secondary boiler in operative connection with the first boiler and having a plurality of internal sub boilers, a boiler control connected to one of the first or secondary boilers, and an external control connected to one of the first or secondary boilers. The boiler control enables the first boiler to control a boiler parameter of the first boiler, the at least one secondary boiler, and the plurality of internal sub boilers of the at least one secondary boiler. A method of operating a networked boiler system includes the steps of connecting a first boiler to at least one secondary boiler, the secondary (Continued)

boiler including a plurality of nested sub boilers; connecting the first boiler to an external control; and with a boiler control connected to one of said first boiler and said at least one secondary boiler, controlling a boiler parameter of said first boiler, said at least one secondary boiler, and said plurality of nested sub boilers of said at least one secondary boiler.

17 Claims, 1 Drawing Sheet

(58) Field of Classification Search
USPC .......................................................... 237/8 A
See application file for complete search history.

(56) References Cited

U.S. PATENT DOCUMENTS

| | | | | |
|---|---|---|---|---|
| 4,337,893 A * | 7/1982 | Flanders | ................. | F24D 12/02 236/1 EB |
| 4,535,401 A * | 8/1985 | Penn | ................... | G08B 26/002 340/10.34 |
| 4,864,972 A * | 9/1989 | Batey | ................... | F22B 35/008 122/448.3 |
| 5,172,654 A * | 12/1992 | Christiansen | ......... | F22B 35/008 122/448.3 |
| 5,419,285 A * | 5/1995 | Gurevich | .................. | F22D 1/04 122/406.1 |
| 5,522,348 A * | 6/1996 | Tanaka | ................... | F22B 31/00 122/367.1 |
| 6,904,624 B2 * | 6/2005 | Leung | ................... | A61H 33/12 4/524 |
| 7,628,123 B2 * | 12/2009 | Inami | ..................... | F24D 12/02 122/448.3 |
| 7,735,459 B2 * | 6/2010 | Cohen | .................... | F24D 12/02 122/448.3 |
| 7,819,334 B2 * | 10/2010 | Pouchak | .................. | F23N 5/00 237/8 R |
| 8,235,707 B2 * | 8/2012 | Kim | ...................... | F24H 9/2042 431/12 |
| 8,271,143 B2 * | 9/2012 | Deivasigamani | ... | F24D 17/0026 700/282 |
| 8,651,064 B2 * | 2/2014 | Paine | ................... | F22B 35/008 122/1 R |
| 8,682,490 B2 * | 3/2014 | Yamada | .................. | F01K 13/02 700/274 |
| 8,910,880 B2 * | 12/2014 | Farrell | ..................... | F24D 3/08 122/15.1 |
| 8,987,931 B2 * | 3/2015 | Marley, II | ................. | F02C 6/00 290/52 |
| 10,030,866 B2 * | 7/2018 | Hyodo | .................. | F22B 35/008 |
| 10,208,947 B2 * | 2/2019 | Maturana | .............. | G06F 9/5072 |
| 2007/0295830 A1 | 12/2007 | Cohen et al. | | |
| 2010/0280665 A1 * | 11/2010 | Fildes | .................. | F24H 9/2035 700/275 |
| 2011/0296838 A1 * | 12/2011 | Ogai | ......................... | F24H 1/40 60/670 |
| 2017/0211821 A1 * | 7/2017 | Hardesty | .................. | F22D 5/34 |

OTHER PUBLICATIONS

Canadian Office Action for Application No. 2,947,863 dated Jan. 31, 2018.

* cited by examiner

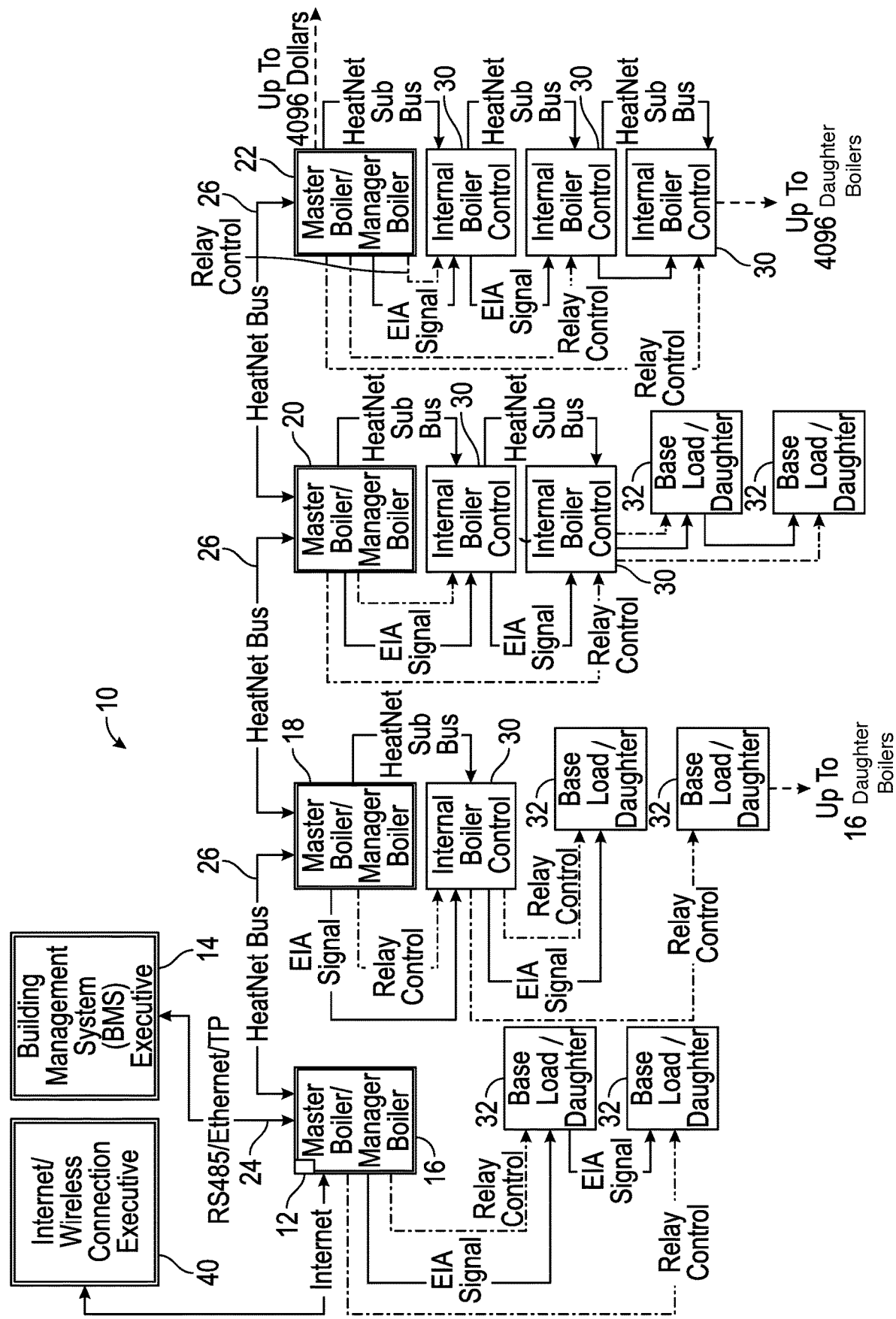

NETWORKED BOILER SYSTEM AND METHOD

CROSS-REFERENCE TO RELATED APPLICATIONS

This application claims the benefit of U.S. Provisional Application Ser. No. 62/251,815, filed on Nov. 6, 2015, wherein is hereby incorporated by reference herein in its entirety.

FIELD OF THE INVENTION

This invention relates generally to a boiler control, and more particularly to a hierarchal control system for a boiler.

BACKGROUND OF THE INVENTION

Existing boiler systems typically include a boiler connected to an external control such as a thermostat or a building management system. The external control typically senses boiler temperature, controls boiler setpoint, performs outdoor reset functions and controls the boiler firing cycle.

In multiple boiler systems, each boiler is typically connected to a single centralized external control from which all boiler operations are performed. The centralized control typically performs the above-listed functions for each individual boiler as well as sequencing or staging the firing of all boilers to control heating throughout a structure. To accomplish this, each boiler may be separately connected to the external control via wiring that is run within the structure to be heated.

Advancements have been made which have obviated the need to separately connect each boiler to the centralized control and which have facilitated the addition and subtraction of boilers within the system. For example, by networking a master boiler with at least one slave boiler, the master boiler may be configured to function as the centralized external control to regulate the networked slave boiler without needing to connect the slave boiler to a centralized control with separate wiring. In this respect, the master boiler may automatically detect and control a newly added/networked boiler and facilitate the repair or replacement of a failed boiler by automatically assigning a new boiler to replace the failed boiler allowing the failed boiler to be brought offline.

While existing system are generally suitable for what is regarded as ordinary performance, there is still a need for improvement in terms of individual boiler and overall system efficiency. In particular, there is a need for a hierarchal control system configured to further maximize a boiler's efficiency, maximize overall heating system efficiency, and to reduce installation costs.

SUMMARY OF THE INVENTION

It is an object of the present invention to provide a networked boiler system.

It is another object of the present invention to provide a networked boiler system having an increased level of control as compared to existing systems.

It is another object of the present invention to provide a networked boiler system that maximizes a boiler's efficiency, maximizes overall heating system efficiency, and reduces installation costs.

It is yet another object of the present invention to provide a networked boiler system having a modular boiler control that reduces costs associated with installing a multiple boiler system by eliminating the need for wiring between each individual boiler and a centralized external control.

It is another object of the present invention to provide a modular boiler control that reduces costs associated with installing a multiple boiler system by networking a master boiler with at least one slave boiler wherein the master boiler functions as a centralized external control to regulate the networked slave boiler.

It is another object of the present invention to provide a modular boiler control that facilitates the addition of boilers to a multiple boiler system.

It is another object of the present invention to provide a modular boiler system that facilitates the addition of boilers to a multiple boiler system through a master boiler that automatically detects and controls a newly added/networked boiler.

It is another object of the present invention to provide a modular boiler control that facilitates the removal of a boiler from a multiple boiler system.

These and other objectives of the present invention, and their preferred embodiments, shall become clear by consideration of the specification, claims and drawings taken as a whole.

According to an embodiment of the present invention, a networked boiler system is provided. The networked boiler system includes a first boiler, at least one secondary boiler in operative connection with the first boiler and having a plurality of internal sub boilers, a boiler control connected to one of the first or secondary boilers, and an external control connected to one of the first or secondary boilers. The boiler control enables the first boiler to control a boiler parameter of the first boiler, the at least one secondary boiler, and the plurality of internal sub boilers of the at least one secondary boiler.

According to another embodiment of the present invention a boiler control for a networked boiler system is provided. The boiler control includes a connector for operatively connecting a first boiler to the boiler control and a control algorithm residing in software in the boiler control. The control algorithm allows the first boiler to control a boiler parameter of the first boiler, of at least one secondary boiler connected to the first boiler, and of a plurality of nested sub boilers within the at least one secondary boiler.

BRIEF DESCRIPTION OF THE DRAWINGS

The present invention will be better understood from reading the following description of non-limiting embodiments, with reference to the attached drawings, wherein below:

FIG. 1 is a simplified schematic diagram illustrating a networked boiler system in accordance with an embodiment of the present invention.

DETAILED DESCRIPTION OF THE PREFERRED EMBODIMENT

U.S. Pat. No. 7,735,459, which is herein incorporated by reference herein in its entirety, discloses a modular boiler system having a modular boiler control in which a master boiler is networked with at least one slave boiler to control the heating loop of a structure. The designated master boiler is configured to function as a centralized external control to regulate the networked slave boiler(s), obviating the need to separately connect each slave boiler to the centralized external control.

FIG. 1 is a simplified schematic illustration of a networked boiler system 10 featuring a modular boiler control 12 according to one embodiment of the present invention. As shown in FIG. 1, the system 10 includes an external control 14 such as a building management system or a thermostat, a modular boiler control 12, and multiple individual boilers 16, 18, 20, 22. The external control 14 is connected to a first boiler 16 via a network cable 24. The first boiler 16 may also be operatively connected to a temperature sensor (not shown). In the system shown in FIG. 1, the first boiler 16 is the "master boiler" as it is operatively connected to the system temperature sensor. The remaining secondary boilers, i.e., the "slave boilers" or "member boilers" 18, 20, 22 are serially connected to the master boiler 16, and to each other, by way of network cables and/or a bus 26.

As will be appreciated, the master boiler does not need to be the boiler directly connected to the modular boiler control 12. Preferably, the master boiler 16 performs several functions, typically referred to as "wall-mount" functions, which are carried out by an external control such as a building management system. These functions include sensing system temperature, controlling system setpoint, controlling outdoor reset and ratio, and staging/firing the master and slave boilers. The master boiler 16 is also capable of communication with the external control 14 which, as stated above, may be a simple thermostat or a more complex building management system.

As will be readily apparent, having the master boiler perform wall-mount functions and control slave boilers through a serial connection is an important aspect of the present invention. In known multiple boiler systems, each boiler is independently connected to the external control through control wiring. With the present system, a single master boiler is connected to an external control eliminating the need for separate control wiring and protective conduit between the control and each system boiler. As such, the present system reduces costs associated with the installation of a multiple boiler system.

As shown in FIG. 1, a first slave boiler 18 is serially connected to the master boiler 16 via a bus 26. Likewise, each slave boiler is serially connected to the adjacent slave boiler through the use of a bus 26. The master boiler 16 is also serially connected via a network cable or bus to the controller 12, which, in turn, is serially connected to the external control 14. In an embodiment, the connections may be RS485 serial lines. As will be appreciated, however, other connecting hardware may be employed provided it allows the master boiler 16 to effectively communicate with the slave boilers. The preferred network protocol is Modbus RTU although other serial communications protocol may be utilized such as LonWorks® or BACnet®.

The master boiler 16 controls the slave boilers 18, 20, 22, 24, through a control algorithm that resides in software in the modular boiler control 12. The control algorithm is yet another important aspect of the present invention as it allows the master boiler 16 to perform the wall-mount tasks typically associated with an external control. Moreover, the algorithm allows for the adjustment of the total number of boilers and their firing rates to achieve a system setpoint temperature. The control algorithm also allows for the automatic detection and recognition of all networked boilers. The modular boiler control 12 is also capable of sensing and controlling optional components such as pumps, dampers, valves and additional sensors.

In connection with the above, the present invention expands on the idea of networked boilers to provide a networked boiler system having additional levels of boiler control, including internal control for each boiler. Indeed, in addition to providing for communication between boilers, the control protocol embodied in the boiler control 12 can be utilized as a manager to communicate down another level/layer through a private communications bus to sub boilers.

In particular, with further reference to FIG. 1, any of the master boiler 16 and the slave boilers 18, 20, 22 may include a plurality of internal burners or boilers 30 (referred to herein as "sub boilers") having an associated internal boiler control. The master boiler 16 and the sub boilers 30 may be in communication with one another via a communications bus in order to allow for full control over the sub boilers, providing a hierarchal control system enabling multiple levels of boiler control, as discussed hereinafter.

In a first level of boiler control, the master boiler 16 is configured to control the sub member boilers 30 in two different modes, an independent mode and a collective mode. In collective mode, all sub boilers 30 are synchronized, monitored and at all times function as a single, unitary boiler. In independent mode, the sub boilers 30 are controlled by the master boiler 16 to follow a firing schedule and rotation to achieve maximum turndown, balanced runtime, and maximum efficiency.

In connection with the above, the manager control function of the master boiler 16 determines the firing rate and the rotation/runtime of the member boilers (sub-boilers). This manager function control will communicate to the member boiler's controls that are configured as non-managers/members, to provide for control over the sub boilers associated with the non-manager/member. In an embodiment, firing rate is determined by a PID loop with the target temperature being determined by the supply side of the boiler, a header temperature from the main boiler system loop DHW temperature, the heating water return side of the boiler, or the system header temp from the master boiler.

In a second level of boiler control, each first level boiler (i.e., master boiler 16 and member boilers 18, 20, 22) is configured to control external boilers, designated as daughter or base load boilers 32, as shown in FIG. 1. These external boilers 32 may typically be older or low technology boilers. The second level control functions can primarily be accomplished using stage control relays and EIA signals (i.e., 4-20 mA, 0-20 mA, 0-10 VDC, 0-5 VDC), as illustrated in FIG. 1.

A third level of control uses multiple of the first level boilers (i.e., master boiler 16 and member boiler(s) 18, 20, 22) employed in a system. In the preferred embodiment, any one of these first level boilers can also assume the role of a "master" boiler in a master/member system, as discussed above.

A fourth level of control allows control from a Building Management System (BMS) 14. The BMS 14 can then control and monitor the system remotely using various industry standard protocols. A fifth level of control allows for remote control access through the Internet or a wireless connection 40 from a remote location.

Importantly, each boiler control can function at any desired level of control. All controls can provide master or member capability, sub boiler support, base load support, BMS support and Internet/wireless support.

In the preferred embodiment, an LCD touch screen may be provided to control each sub boiler connected to the screen. The status of each sub boiler can then be viewed and settings for each sub boiler changed. This minimizes the number of displays required for the system, as a whole. The LCD screen, along with a USB/network/serial port can be selected to allow new firmware to be loaded on the master boiler/manager 16 to allow new firmware to be loaded on the master 16 and copied to all sub-boilers.

The system 10 of the present invention also provides for direct level of control using control staging relays and a 4-20 mA signal running to each sub boiler, which allows for direct control using traditional analog signals.

In the preferred embodiment, the various control levels discussed above are based on the Microchip™ Pic32 microcontroller. There are 4 analog outputs, 8 sensor inputs, 2 0-10 VDC/4-20 MA, 5 communications ports including 1 Ethernet, display connector for text displays and color LCD touch panels, 11 dedicated relay outputs and USB/Flash-drive connections. The control also provides an interface to an Ignition Control Module (not shown) and blower speed control based on a PID loop. Temperature sensing system loops, local boiler loops, and outside air sensing are elements of the closed loop PIDs.

As discussed above, the control protocol of the present invention, in addition to allowing for communication between a number of distinct boilers in a master/slave arrangement, can be utilized to communicate down another level through a private communications bus to sub-boilers within a main boiler. Each boiler may have a control, such that no stand-alone controls are utilized. As discussed above, each internal control can be configured as a master or member, and can also assume the control functions as a master/manager or as a member/manager along with full base load boiler control.

Further to the above, the communications bus through which the boilers are networked allows the master or executive level BMS 14 to look at an operational status of each boiler and each boiler's specifications. A specification for each boiler control may be defined as the control that is configured with each type boiler. Since a control is associated with each boiler, the nested sub boilers also have these operational status and specifications. The specifications may include parameters such as product name (including a boiler's product part number, company and product lines), whether the boiler is a condensing-type boiler or non-condensing type boiler, mass (i.e., mass of the heat exchanger for use by PID firing), priority mode, BTU size, blower type, fuel type, minimum firing rate, maximum firing rate, options, minimum water flow allowed by the boiler, maximum water flow allowed by the boiler, turndown (i.e., ratio of maximum fire rate to minimum fire rate of the boiler, miscellaneous, sub boilers (i.e., the number of sub boilers controlled by the boiler operating as manager), and efficiency (i.e., the efficiency equation for the subject boiler).

Priority mode allows for control of the firing a boiler according to a priority hierarchy such as firing a condensing type boiler first and non-condensing type boiler second or firing smaller boilers first and larger boilers second. BTU size may be utilized when it is desired to fire a boiler based on BTU. BTU size may be utilized to determine the maximum energy available in the system, to allow calculation for system load in BTUs, and for selecting the most appropriate boiler to fire based on load conditions. Blower type may include, but is not limited to, PWM based blower control, 0-10 based blower control and 135 Ohm blower control. Fuel type may include, but is not limited to, natural gas, propane, oil and dual fuel (e.g., propane, natural gas and oil). As will be readily appreciated, minimum and maxing firing rate for each boiler is necessary when calculating BTU size and efficiency. As indicated above, the sub-boiler specification parameter defines whether the subject boiler is stand-alone or has boilers nested inside of it. If boilers are nested inside of it, a new communications channel based on the control protocol is opened to communicate with the sub boilers. These sub boilers are then brought on, and modulated based on the requirements from the manager.

Operating status of each boiler may include whether the boiler is operating as master or member, water flow provided—system or local, system return temperature provided, DHW combo space heating available, outdoor air setpoint control, BMS remote control connection, boiler status, interlocks, temperatures, and run percentage of the boiler's operating range.

In an embodiment, all boilers within the system can function as domestic hot water boilers or as space heating boilers. The control protocol has 2 PID loops to control heating separately. This functionality is added to the sub-boilers/member boilers under control of the master boiler.

The system and control protocol of the present invention therefore ties existing boiler control techniques under a single control. This control can provide all the functionality of many controls in a layered hierarchy, providing redundancy, ease of maintenance and setup, and flexibility. As discussed above, the present invention therefore provides a true hierarchal control that can push data/control functions up or down from a BMS or higher, to the lowest base load boiler. In particular, the system of the present invention provides for master and coordinated control of networked, member boilers, including control of any external daughter or base load boilers connected to the member boilers and internal burners or sub boilers associated with the member boilers.

Importantly, all controls can provide the same functionality, making the control system interchangeable. This allows swapping of controls to fix a heating system that is down until new parts arrive and can be installed. In addition, support for older boilers in a modern control system using base load boilers is provided.

While the invention has been described with reference to the preferred embodiments, it will be understood by those skilled in the art that various obvious changes may be made, and equivalents may be substituted for elements thereof, without departing from the essential scope of the present invention. Therefore, it is intended that the invention not be limited to the particular embodiments disclosed, but that the invention includes all embodiments falling within the scope of the appended claims.

What is claimed is:

1. A networked boiler system, comprising:
   a first boiler;
   at least one secondary boiler in operative connection with said first boiler and having a plurality of internal sub boilers;
   a boiler control connected to one of said first or secondary boilers and configured to control said sub boilers in a collective mode and an independent mode; and
   an external control connected to said first boiler,
   wherein said external control enables said boiler control to adjust a boiler parameter of at least one of said first boiler, said at least one secondary boiler, and said plurality of internal sub boilers of said at least one secondary boiler, and
   wherein said boiler control is configured to synchronize said sub boilers so that said sub boilers function as a whole in said collective mode and said boiler control is configured to control said sub boilers according to a firing schedule and rotation to achieve maximum turndown, balanced runtime, and maximum efficiency in said independent mode.

2. The networked boiler system of claim 1, wherein:

said first boiler has a plurality of internal sub boilers; and
said boiler control enables said first boiler to adjust a boiler parameter of said plurality of internal sub boilers of said first boiler.

3. The networked boiler system of claim 1, further comprising:
at least one external, base load boiler in operative connection with one of said first boiler or the at least one secondary boiler;
wherein said boiler control enables said first boiler to adjust a boiler parameter of said at least one external, base load boiler.

4. The networked boiler system of claim 1, wherein:
said external control is one of a thermostat and a building management system.

5. The networked boiler system of claim 1,
said external control is connected to said first boiler through a wireless connection for providing remote control of said boiler parameters.

6. The networked boiler system of claim 1, wherein:
said boiler parameter includes a temperature set point, a firing rate or a firing sequence of said first boiler and said at least one secondary boiler.

7. The networked boiler system of claim 6, wherein:
said boiler parameter includes a temperature set point, a firing rate or a firing sequence of said sub boilers of said at least one secondary boiler.

8. A boiler control for a networked boiler system, comprising:
a connector for operatively connecting a first boiler to an external boiler control; and
a control algorithm residing in software in said external boiler control configured to control said sub boilers in a collective mode and an independent mode,
wherein said control algorithm allows said first boiler to adjust a boiler parameter of at least one secondary boiler connected to said first boiler and a plurality of sub boilers within the at least one secondary boiler, and
wherein said control algorithm is configured to synchronize said sub boilers so that said sub boilers function as a whole in said collective mode and said control algorithm is configured to control said sub boilers according to a firing schedule and rotation to achieve maximum turndown, balanced runtime, and maximum efficiency in said independent mode.

9. The boiler control of claim 8, wherein:
said control algorithm allows said first boiler to adjust a boiler parameter of at least one external, base load boiler in operative connection with one of said first boiler and the at least one secondary boiler.

10. The boiler control of claim 8, wherein:
said boiler parameter is a temperature set point, a firing rate or a firing sequence for said first boiler and said at least one secondary boiler.

11. The boiler control of claim 8, wherein:
said boiler parameter includes a temperature set point, a firing rate or a firing sequence of said sub boilers of said at least one secondary boiler.

12. A method of operating a networked boiler system, comprising the steps of:
connecting a first boiler to at least one secondary boiler, the secondary boiler including a plurality of sub boilers;
connecting the first boiler to an external control;
sending a boiler parameter from the external control to the first boiler; and
controlling said at least one secondary boiler and said plurality of sub boilers of said at least one secondary boiler based on said boiler parameter in a collective mode and an independent mode,
wherein said boiler control is configured to synchronize said sub boilers so that said sub boilers function as a whole in said collective mode and said boiler control is configured to control said sub boilers according to a firing schedule and rotation to achieve maximum turndown, balanced runtime, and maximum efficiency in said independent mode.

13. The method according to claim 12, wherein:
said first boiler has a plurality of nested sub boilers, and
said boiler control adjusts a boiler parameter of said plurality of nested sub boilers of said first boiler.

14. The method according to claim 12, further comprising the step of:
connecting at least one external, base load boiler with one of the first boiler and the secondary boiler; and
controlling a boiler parameter of said at least one external, base load boiler with said boiler control.

15. The method according to claim 12, wherein:
said external control is one of a thermostat and a building management system.

16. The method according to claim 15, wherein:
said external control is connected to one of said first or secondary boilers through a wireless connection for providing remote control of said boiler parameters.

17. The method according to claim 12, wherein:
said boiler parameter includes a temperature set point, a firing rate or a firing sequence of said first boiler, said at least one secondary boiler and said plurality of sub boilers.

* * * * *